United States Patent [19]
Scholz et al.

[11] Patent Number: 5,818,589
[45] Date of Patent: Oct. 6, 1998

[54] DEVICE FOR AND METHOD OF MEASURING ABSOLUTE ROTATIONS IN SEVERAL DIRECTIONS IN SPACE

[75] Inventors: Joachim Scholz, Marbach a.N.; Michael Oswald, Schwieberdingen, both of Germany

[73] Assignee: Standard Elektrik Lorenz Akliengisellschaft, Germany

[21] Appl. No.: 712,194

[22] Filed: Jun. 7, 1991

[30] Foreign Application Priority Data

Jun. 8, 1990 [DE] Germany ............ 40 18 397.1

[51] Int. Cl.⁶ .................................................. G01C 19/64
[52] U.S. Cl. ........................................................ 356/350
[58] Field of Search ............................................. 356/350

[56] References Cited

U.S. PATENT DOCUMENTS 4,828,389  5/1989  Og .................................... 356/350
5,184,195  2/1993  Goldner ........................... 356/350

FOREIGN PATENT DOCUMENTS 0288032  10/1988  European Pat. Off. .
2941618   4/1981  Germany .

OTHER PUBLICATIONS

E.J. Post, "Sagnac Effect", *Reviews of Modern Physics*, v 39 n 2 (1976) pp. 475–493.

*Primary Examiner*—Vincent P. McGraw

[57] ABSTRACT

To measure absolute rotations in several directions in space with the aid of interferometers, one interferometer is required for each direction in space. According to the invention, it is proposed to supply a device consisting of several interferometers from a common light source and to switch only the phase modulation impressed on the light rather than the light paths, using time-division multiplexing. The output signals from the interferometers are detected and evaluated with a single detector and evaluating unit.

9 Claims, 3 Drawing Sheets

FIG.2

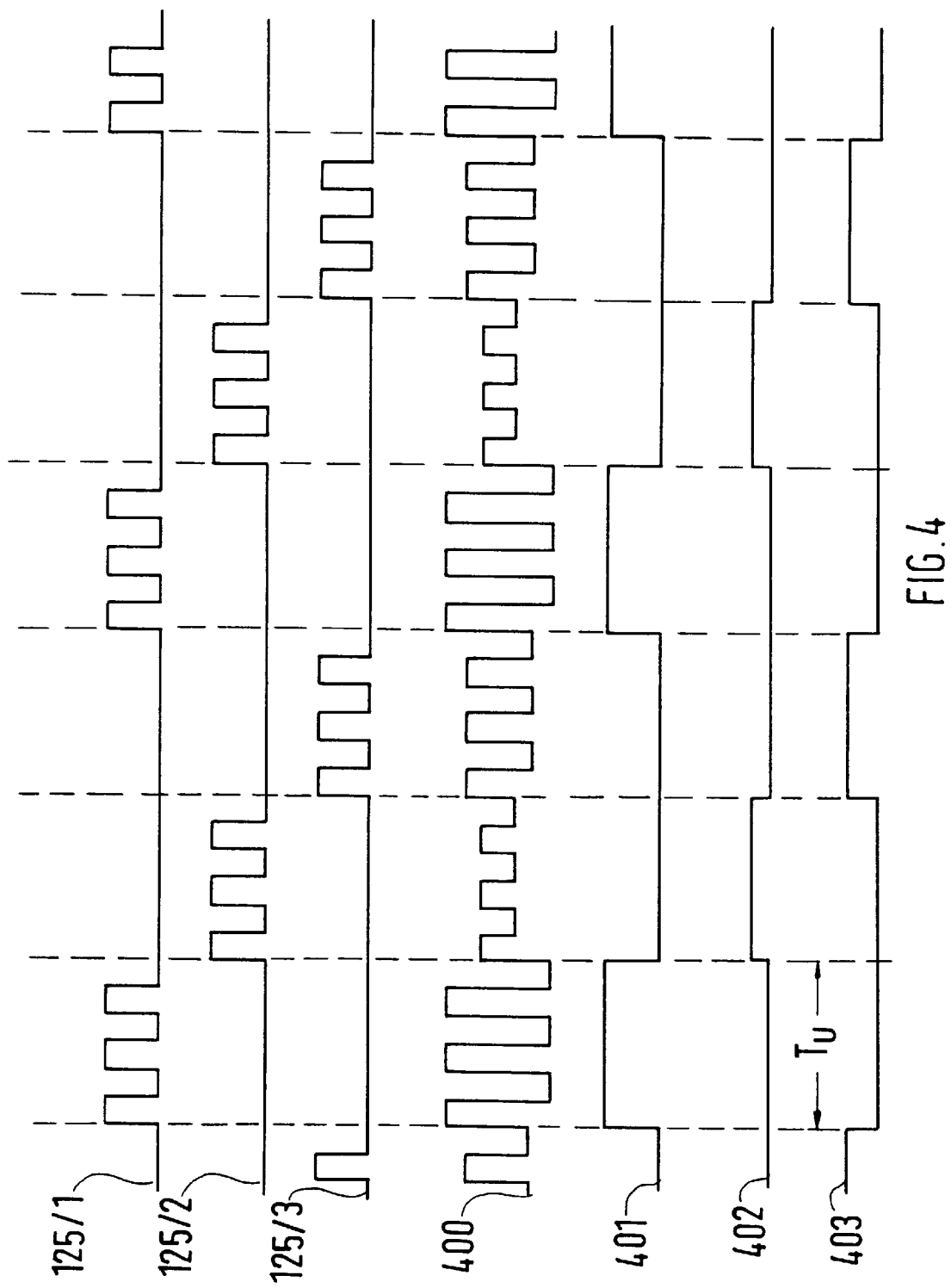

DEVICE FOR AND METHOD OF MEASURING ABSOLUTE ROTATIONS IN SEVERAL DIRECTIONS IN SPACE

TECHNICAL FIELD

The present invention relates to a device for and a method of measuring absolute rotations in several directions in space.

CLAIM FOR PRIORITY

This application is based on and claims priority from German Patent Application No. 40 18 397.1 dated 8 Jun. 1990, To the extent such prior application may contain any additional information that might be of any assistance in the use and understanding of the invention claimed herein, it is hereby incorporated by reference.

BACKGROUND ART

A method of measuring absolute rotations in several directions in space is disclosed in German Patent DE-C2 29 41 618. This method is based on the use of the Sagnac effect. A detailed description of the Sagnac effect is given in an article by E. J. Post, "Sagnac Effect", Reviews of Modern Physics, Vol. 39, No. 2 (1976), pages 475 to 493. Since the physical principles of the Sagnac effect do not form part of the present invention, they will not be discussed in the following.

In the prior art method, a separate ring interferometer is used for each direction in space. To measure rotation rates in three directions in space, therefore, three ring interferometers are needed. However, all three ring interferometers are supplied from a single light source. The measurements in the different directions in space are made using time-division multiplexing. The individual interferometers are controlled by arranging that the light path to an interferometer is open only if a measurement is to be made with this interferometer.

The prior art method has the disadvantage that the entire light output to an interferometer must be switched.

DISCLOSURE OF INVENTION

It is the object of the invention to provide a device and a method in which the multiplex operation is performed without switching the light paths. According to the invention, the modulation impressed on the light directed to the interferomters is switched, using time-division multiplexing. The output signals from the interferometers are then detected with a single detector.

The device according to the invention has the advantage of requiring only a single detector to measure rotation rates in several directions in space. Another advantage is that, as a result of the activation/deactivation of the modulators, very high switching frequencies are possible. The limiting values of the switching period are determined by the modulation frequency (upper limit) and the time dynamics of the rotation rate to be measured (lower limit). A further advantage lies in the fact that, since common drive and evaluation electronics are provided, size, power consumption, and costs are considerably reduced.

BRIEF DESCRIPTION OF DRAWINGS

An embodiment of the invention will now be explained with reference to the accompanying drawings, in which:

FIG. 4 shows waveforms for the interferometer of FIG. 2.

BEST MODE FOR CARRYING OUT THE INVENTION

Figure 1:
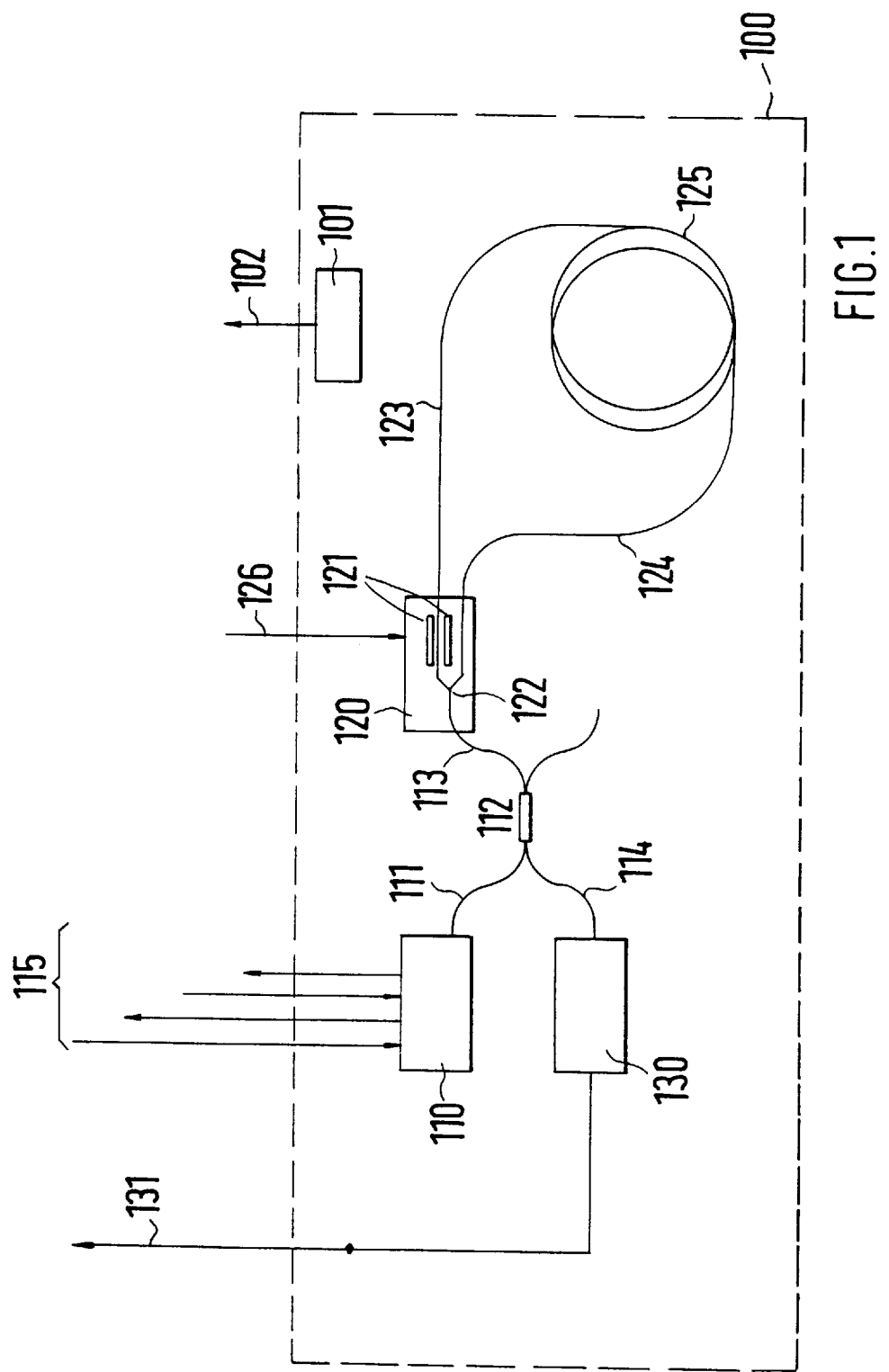
FIG. 1 shows an interferometer for one direction in space.

Referring to FIG. 1, there is shown a case 100 which contains a number of elements necessary to operate the interferometer. The element 101 is a temperature sensor which is connected by a line 102 to a drive or processing unit (not shown). 110 denotes a source module containing a laser diode, a temperature sensor, and a Peltier cell. The connections necessary to control and monitor the source module are designated 115. The light generated in the source module 110 propagates along a fiber 111 to a fiber coupler 112 and from there along a fiber 113 to an integrated optical circuit 120. The integrated optical circuit 120 contains a beam splitter 122 and an optical phase modulator 121. The phase modulator is driven via a line 126. The two light beams from the beam splitter 122 are launched into the ends 123 and 124 of a closed light path 125, in the case of fiber gyros an optical-fiber coil. They traverse the light path in opposite directions and interfere in the beam splitter 122. Rotation of the closed light path 125 in a direction perpendicular to its axis results in a phase shift between the circulating beams, and hence a variation of the interference pattern. A detector 130, which is supplied with the interference pattern from the beam splitter 122 via a fiber 114, measures the intensity of the interference signal. By applying a phase shift between the two beams which varies periodically at a frequency f, a periodic output signal at the modulation frequency is obtained. Evaluation of the amplitude of this signal, e.g., in an evaluating unit described below, which is connected to the detector 130 by a line 131, provides the information on the phase shift in the interferometer and, thus, on the rotation rate. The elements described so far and their operation are in the prior art and familiar to those skilled in the fiber-gyro art.

Figure 2:
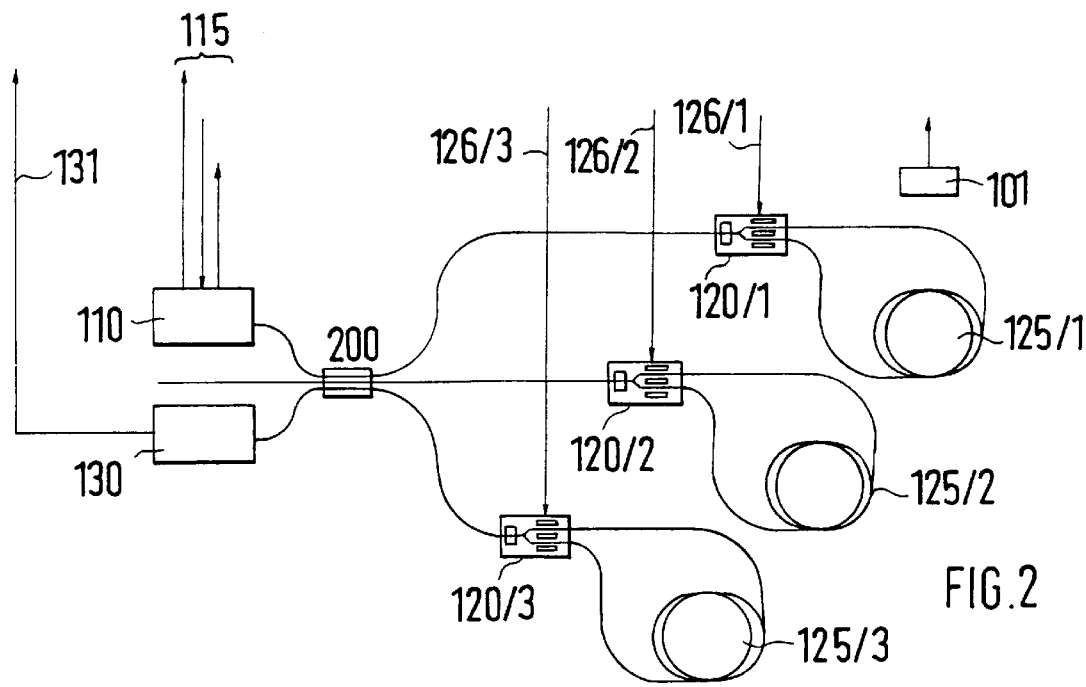
FIG. 2 shows an interferometer according to the invention for three directions in space.

FIG. 2 shows a device which contains not only one interferometer, but three. With such a device, therefore, absolute rotation rates can be measured in three different directions in space. Like reference characters have been used to designate like elements. For all three closed light paths 125/1, 125/2, and 125/3, a single source module 110 is present. The output of this source module 110 is distributed to the three interferometers in a coupler 200. Each interferometer contains an integrated optical circuit. The integrated optical circuits are designated 120/1, 120/2, and 120/3. Each of these integrated optical circuits contains a beam splitter and an electrooptical phase modulator. Neither has been provided with reference characters since the drawing is self-explanatory. The electrooptical modulators are driven via lines 126/1, 126/2, and 126/3. The output of the detector module 130 then provides a periodically varying electric signal.

Figure 3:
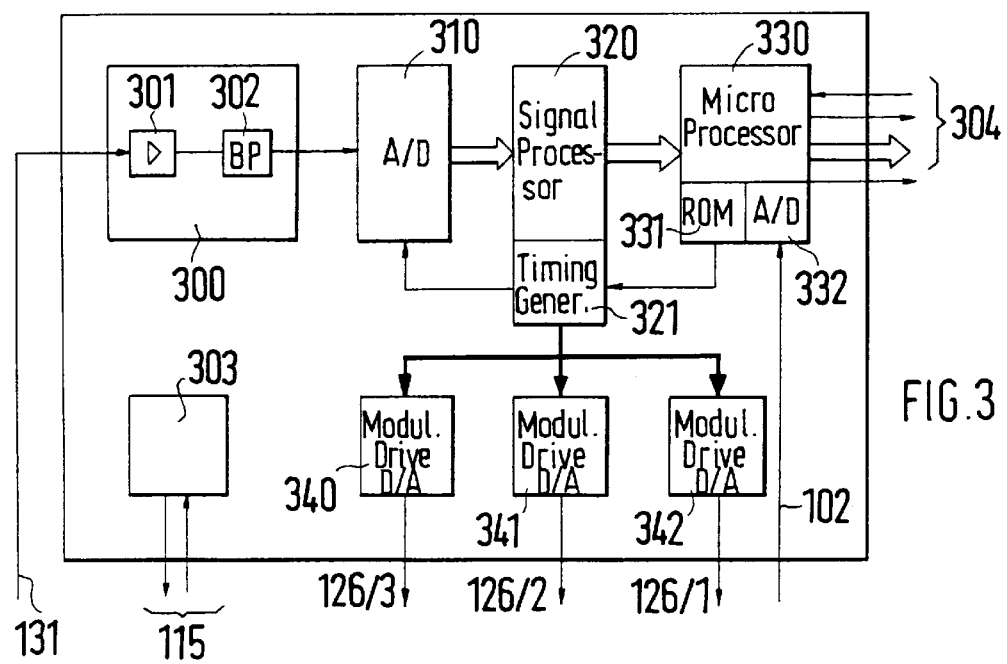
FIG. 3 shows a drive unit for the interferometer of FIG. 2.

In FIG. 3, the reference characters 300 denote an input circuit which contains an amplifier 301 and bandpass filter 302. The output of the input circuit 300 is applied to an analog-to-digital converter 310, whose digital output end is connected to a signal processor 320. The signal processor 320, which includes a timing generator 321, is connected to a microprocessor 330, which includes a ROM 331 and an analog-to-digital converter 332. The timing generator 321 controls three drivers 340, 341, and 342. These three drivers supply the three modulators 120/1 to 120/3 with modulating signals via the lines 126/1 to 126/3. The signal processor 320 drives the phase modulator of one interferometer at a time for a certain period $T_u$ and stores the results of the evaluation in a digital memory associated with the interferometer, e.g., in the microprocessor 330. Then, the modulator of the next interferometer is activated, while the two other modulators are deactivated. The switching of the modulation may be effected, for example, by switching a common signal generator to the different phase modulators or by turning the generators of the individual gyros on and off. The multiplexing method can be used with both open-loop and closed-loop systems. In a closed-loop system, the results of the signal processing must be stored upon each changeover to the next interferometer until the next cycle. No mention has so far been made of a current control 303 for the source module 110. The current control 303 is connected to the source module 110 via part of the lines designated 115. The microprocessor 330 is connected with peripherals (not shown) via lines 304.

Typical characteristics of the interferometers described are:

| | |
|---|---|
| Fiber Length: | 100 m |
| Coil diameter: | 80 mm |
| Modulation frequency: | 1 MHz |
| Switching period of the three sensors: | 1 kHz |
| Measurement period/sensor/period: | 333 ms |

FIG. 4 shows the waveforms of signals in the three interferometers 125/1, 125/2, and 125/3. The uppermost line shows the modulation for the interferometer 125/1, the line therebelow the modulation for the interferometer 125/2, and the third line the modulation for the interferometer 125/3. The multiplex operation consists in the fact that whenever the modulator of one interferometer is active, the modulators of the two other interferometers are inactive. The output of the detector module 130 is then the waveform 400. As the output signal of the entire device, waveforms 401, 402, and 403 are obtained. The waveform 401 belongs to the interferometer 125/1, the waveform 402 to the interferometer 125/2 and the waveform 403 to the interferometer 125/3. Since the drive pulse rate for the individual modulators is known, the output signals can be unambiguously assigned to the individual interferometers.

The above-described device and the above-described method for operating interferometers in a time-division multiplex mode are not limited to Sagnac interferometers but can be used for the time-division multiplex operation of any other interferometers with phase modulation.

We claim:

1. Device for measuring absolute rotations in several directions in space using the Sagnac effect, comprising
   at least one light source,
   at least two interferometers,
   a beam splitter which divides light generated by the light source into separated beams and directs each of said beams to a respective one of said interferometers,
   at least two optical phase modulators each connected in a respective one of the interferometers,
   a drive unit which drives the optical phase modulators in a time-division multiplex mode, and
   a common detector for simultaneously receiving a phase modulated output from one of the interferometers and an unmodulated output from each of the other interferometers.

2. A device as claimed in claim 1, wherein said electrooptical modulators are constructed in the form of integrated circuits.

3. A device as claimed in claim 1, wherein each of said interferometers has a memory device associated therewith.

4. Method of measuring absolute rotations in several directions in space using the Sagnac effect wherein
   light from a light source is divided by a beam splitter into separated beams which are directed to at least two interferometers each including one optical phase modulator,
   the optical phase modulators are driven in a time-division multiplex mode by a common drive unit, and
   a modulated output signal from one of the interferometers and an unmodulated output signal from each of the other interferometers are simultaneously received by a single detector.

5. A method as claimed in claim 4, wherein measurements results obtained with each of said interferometers are stored in a memory device associated with said each interferometer.

6. A method as claimed in claim 5, characterized by being used in an open-loop system.

7. A method as claimed in claim 5, characterized by being used in a closed-loop system.

8. A method as claimed in claim 7, wherein upon each changeover within a time-division multiplex to the next interferometer, results of a signal-processing operation are stored until the next cycle.

9. A triaxial fiber optic Sagnac interferometer for measuring rotation rates about three axes comprising, in combination;
   a) a source of optical energy;
   b) a first, a second and a third gyroscope for measuring rotation rates about a first, a second and a third axis respectively;
   c) each of said gyroscopes comprising a coil of optical fiber;
   d) means for launching said optical energy into each of said coils as counterpropagating waves;
   e) phase modulators located in each of said coils for artificially modulating the phase difference between said counterpropagating waves;
   f) a single detector for receiving the output of each of said gyroscopes;
   g) an optical network for receiving the output of said source, distributing said output to said gyroscopes, receiving the output of said gyroscopes and transmitting said outputs to said single detector; and
   h) means for driving said phase modulators with three mutually out-of-phase modulation sequences of common frequency so that the outputs of said gyroscopes are distinguishable at said detector.

* * * * *